(12) United States Patent
Woo et al.

(10) Patent No.: US 9,064,347 B2
(45) Date of Patent: Jun. 23, 2015

(54) METHOD, MEDIUM, AND SYSTEM RENDERING 3 DIMENSIONAL GRAPHICS DATA CONSIDERING FOG EFFECT

(75) Inventors: Sang-oak Woo, Anyang-si (KR); Seok-yoon Jung, Seoul (KR); Chan-min Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1320 days.

(21) Appl. No.: 11/882,579

(22) Filed: Aug. 2, 2007

(65) Prior Publication Data

US 2008/0122844 A1 May 29, 2008

(30) Foreign Application Priority Data

Nov. 23, 2006 (KR) ........................ 10-2006-0116583

(51) Int. Cl.
*G06T 15/04* (2011.01)
*G06T 15/50* (2011.01)

(52) U.S. Cl.
CPC .............. *G06T 15/503* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 5,724,561 A * | 3/1998 | Tarolli et al. | 345/561 |
| 6,037,946 A * | 3/2000 | Takeda | 345/422 |
| 6,064,392 A * | 5/2000 | Rohner | 345/426 |
| 6,268,861 B1 | 7/2001 | Sanz-Pastor | |
| 6,437,781 B1 * | 8/2002 | Tucker et al. | 345/426 |
| 6,580,430 B1 | 6/2003 | Hollis | |
| 6,791,558 B2 | 9/2004 | Park et al. | |
| 7,046,243 B1 | 5/2006 | Mech | |
| 7,719,544 B2 * | 5/2010 | Boyd et al. | 345/582 |
| 2001/0030648 A1 * | 10/2001 | Deering | 345/426 |
| 2002/0154135 A1 * | 10/2002 | Andrews | 345/583 |
| 2002/0196251 A1 * | 12/2002 | Duluk et al. | 345/420 |
| 2003/0193496 A1 * | 10/2003 | Wada | 345/419 |

FOREIGN PATENT DOCUMENTS

| | | |
|---|---|---|
| EP | 1 156 455 | 11/2001 |
| EP | 1 376 472 | 1/2004 |
| JP | 7-220114 | 8/1995 |
| JP | 9-212680 | 8/1997 |
| JP | 10-269370 | 10/1998 |
| JP | 2003-162734 | 6/2003 |
| JP | 2004-5452 | 1/2004 |
| WO | 01/69538 | 9/2001 |

OTHER PUBLICATIONS

Biri, V., Michelin, S., Arques, D.: Real-time animation of realistic fog. In: Rendering Techniques 2002 (Proceedings of the Thirteenth Eurographics Workshop on Rendering) (Jun. 2002).*

(Continued)

*Primary Examiner* — Daniel Hajnik
(74) *Attorney, Agent, or Firm* — NSIP Law

(57) ABSTRACT

A method, medium, and system efficiently rendering 3 dimensional (3D) graphics data. The rendering method includes calculating the strength of a fog effect that is to be applied to graphics data, determining whether texture mapping must be performed on the graphics data, according to the strength of the fog effect, and performing the texture mapping according to the determination result. Accordingly, it is possible to reduce the number of memory access operations for reading textures.

23 Claims, 9 Drawing Sheets

(56) References Cited

OTHER PUBLICATIONS

Jolivet, V., Plemenos, D., Poulingeas, P.: Declarative specification of ambiance in VRML landscapes. In: ICCS 2004 international conference (CGGM 2004), Krakow, Poland, Jun. 6-9, 2004. LNCS, pp. IV115-IV122. Springer, Heidelberg (2004).*

M. Wimmer, "Representing and Rendering Distant Objects for Real-Time Visualization", Technische Universität Wien, Dissertation, Jun. 2001.

T. Möller et al., "Real-Time Rendering", 1999, A.K. Peters Ltd., Natick, Massachusetts, pp. 89-92.

M. Olano et al., "Automatic Shader Level of Detail", Proceedings of the ACM Siggraph/Eurographics Conference on Graphics Hardware, 2003, pp. 7-14.

European Search Report issued Mar. 19, 2008 in corresponding European Patent Application No. 07121427.4-2218.

Japanese Office Action dated Jan. 31, 2012 issued in corresponding Japanese Patent Application No. 2007-290087.

Rikk Carey et al., "The Annotated VRML 97 Reference Manual", 1997, pp. 1-4, http://www.cs.vu.nl/~eliens/documents/vrml/reference/BOOK.HTM.

* cited by examiner

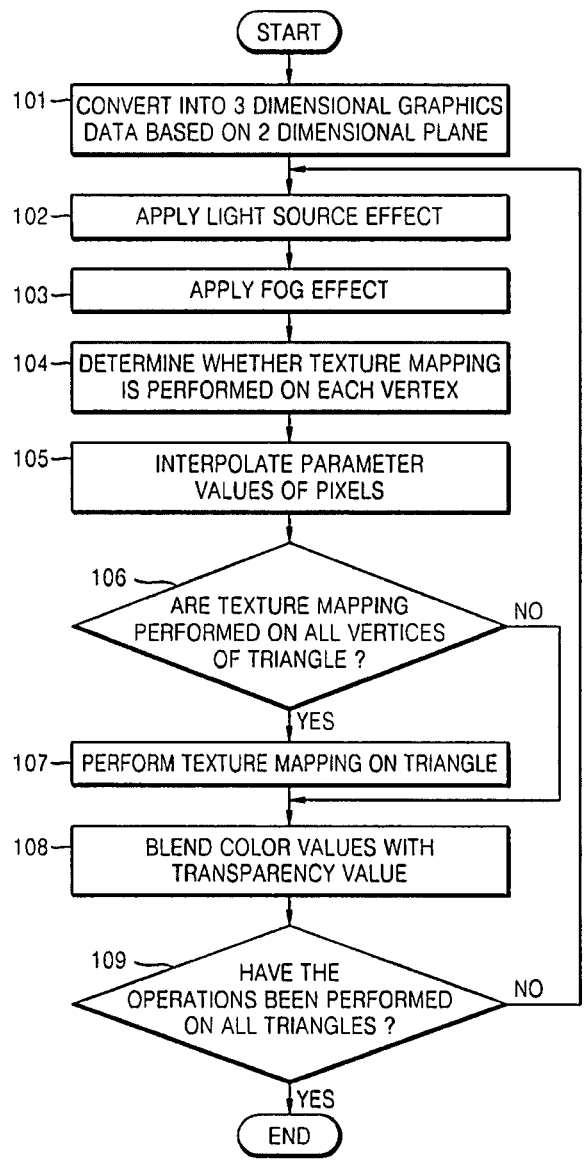

METHOD, MEDIUM, AND SYSTEM RENDERING 3 DIMENSIONAL GRAPHICS DATA CONSIDERING FOG EFFECT

CROSS-REFERENCE TO RELATED APPLICATIONS

This application claims the benefit of Korean Patent Application No. 10-2006-0116583, filed on Nov. 23, 2006, in the Korean Intellectual Property Office, the disclosure of which is incorporated herein in its entirety by reference.

BACKGROUND

1. Field

One or more embodiments of the present invention relate to a method, medium, and system rendering 3 dimensional (3D) graphics data, and more particularly, to a method, medium, and system efficiently rendering 3D graphics data.

2. Description of the Related Art

Conventional techniques for rendering 3D graphics data include vertex processing for calculating parameter values of vertices of a triangle, as a constituent unit of an object represented by 3D graphics data, scan conversion for calculating parameter values of pixels of such a triangle, texture mapping for applying a texture corresponding to a 2 dimensional image stored in a memory to the object, and blending processing for blending the calculated parameter values so as to calculate final parameter values of the pixels.

However, the conventional 3D graphics data rendering techniques require a very large number of calculations and memory access operations. Accordingly, due to the required demands, mobile terminals such as mobile phones and Personal Digital Assistant (PDA), low-end desktop PCs having low hardware performance, etc., cannot render 3D graphics data in real time.

SUMMARY

One or more embodiments of the present invention provide a method, medium, and system minimizing the number of memory access operations performed in texture mapping when 3 dimensional (3D) graphics data is rendered.

Additional aspects and/or advantages will be set forth in part in the description which follows and, in part, will be apparent from the description, or may be learned by practice of the invention.

To achieve the above and/or other aspects and advantages, embodiments of the present invention include a rendering method, including selectively implementing one of performing and not performing texture mapping on respective graphics data based on a respective fog effect applied to the respective graphics data.

To achieve the above and/or other aspects and advantages, embodiments of the present invention include a medium including computer readable code to control at least one processing element to implement a rendering method, the rendering method including selectively implementing one of performing and not performing texture mapping on respective graphics data based on a respective fog effect applied to the respective graphics data.

To achieve the above and/or other aspects and advantages, embodiments of the present invention include a system with rendering, including a texture mapping unit to selectively implement one of performing and not performing texture mapping on respective graphics data based on a respective fog effect applied to the respective graphics data.

BRIEF DESCRIPTION OF THE DRAWINGS

These and/or other aspects and advantages will become apparent and more readily appreciated from the following description of the embodiments, taken in conjunction with the accompanying drawings of which:

FIG. 10 illustrates a method for rendering 3D graphics data using a vertex fog effect, according to an embodiment of the present invention.

DETAILED DESCRIPTION OF EMBODIMENTS

Figure 1:
FIG. 1 illustrates a rendering of 3 dimensional (3D) graphics data with an applied fog effect, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates a rendering of dimensional (3D) graphics data rendered with an applied fog effect, according to an embodiment of the present invention.

Referring to FIG. 1, distant buildings appear very blurred because of a fog effect between the distant buildings and a viewpoint. As such, this fog effect means an effect adding realism to 3D images by making distant objects appear blurred. The farther the distance between a viewpoint (for a camera) of a 3D image and an object, the stronger the fog effect. If the distance between the camera and the object is above a predetermined distance, the inherent color and texture of the object may be caused to completely disappear from view.

In order to solve the aforementioned conventional drawbacks, in one or more embodiments, 3D graphics data may be efficiently rendered and rendering power minimized by disallowing memory accessing for reading a texture when an object loses its inherent color and texture due to the fog effect.

Generally, a fog effect can be implemented by calculating fog factor values 'f' for pixels of an object and applying the fog factor values 'f' to the color values of the object. Such a fog factor value f of a certain pixel denotes the strength of the fog effect that is to be applied to the pixel. The following Equations 1, 2, and 3 are example formulas for obtaining a fog factor value f. Here, in these examples, "f=0" means a full fog, and "f=1" means no fog.

$$f = \frac{end - d}{end - start} \quad \text{Equation 1}$$

Here, "end" means a point at which a fog is terminated, and "start" means a point at which the fog starts.

In addition, here, "d" denotes the distance between a viewpoint (for example, a hypothetical camera) of a 3D image represented by 3D graphics data and a location at which a fog will be displayed.

$$f = 1/e^{d \times density} \quad \text{Equation 2:}$$

$$f = 1/e^{(d \times density)^2} \quad \text{Equation 3:}$$

Here, in Equations 2 and 3, "d" has the same meaning as in Equation 1, and "density" means the density of the fog.

Figure 2:
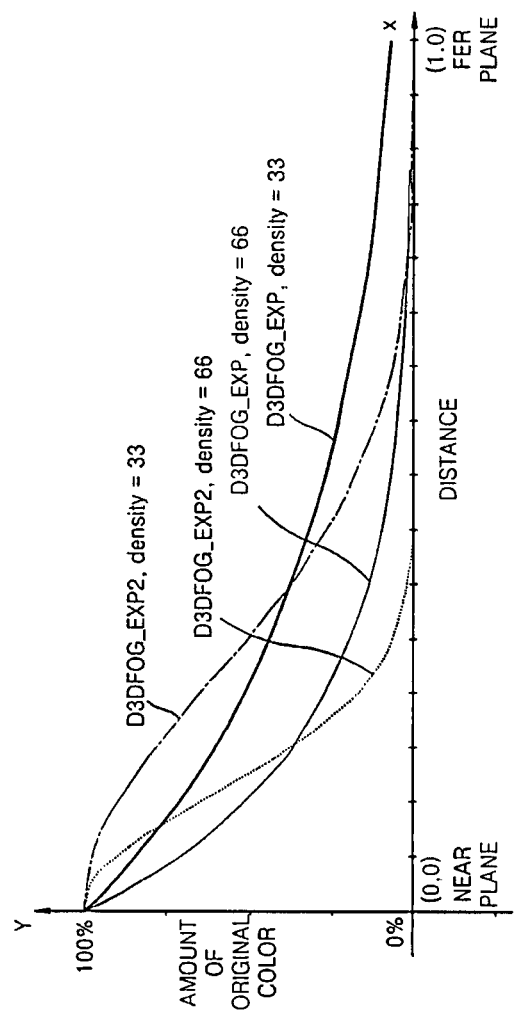
FIG. 2 is a graph plotting a change of a fog factor 'f', with respect to a distance between a viewpoint of a 3D image and a location at which a fog will be displayed, according to an embodiment of the present invention.

FIG. 2 is a graph plotting a change of the fog factor value f with respect to the distance between a viewpoint of a 3D image and the location at which the fog will be displayed.

Referring to FIG. 2, it can be seen that the fog factor value f according to "d", in the above example Equations 1, 2, and 3, depends on fog density and the type of equation used for calculating the fog factor value f. However, in all cases, as the distance "d" between a viewpoint of a 3D image and a location at which a fog will be displayed increases, the fog effect becomes stronger and the original color of the 3D image gradually disappears.

Figure 3:
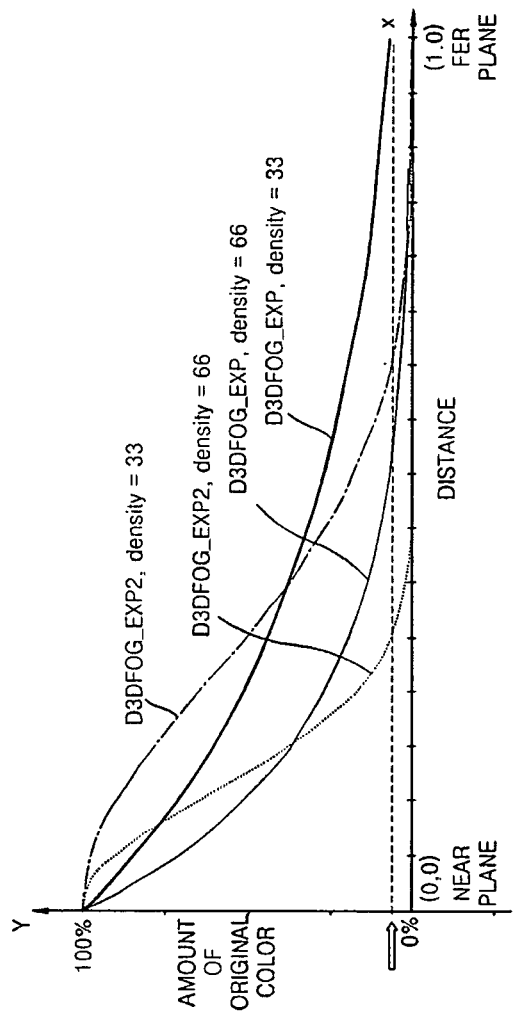
FIG. 3 is a view in which a threshold value is denoted in the graph illustrated in FIG. 2.

FIG. 3 is a view in which a threshold value is denoted in the graph illustrated in FIG. 2.

Referring to FIG. 3, in addition to the graph shown in FIG. 2, an arrow, along the Amount of Original Color axis, is additionally shown. The arrow identifies an example threshold value of the fog factor value f. If the fog factor value f of a certain pixel does not exceed the threshold value, texture mapping for the pixel may not be needed, according to an embodiment of the present invention. In further example embodiments, the threshold value is compared with a fog factor value f, e.g., calculated using the above Equations 1, 2, and 3, and texture mapping may be performed according to the comparison result.

The fog effect may be classified into a vertex fog effect and a pixel fog effect, according to whether fog factor values f are calculated during vertex processing or during pixel processing. In the case of the vertex fog effect, fog factor values f may be calculated during vertex processing, and in the case of the pixel fog effect, fog factor values f may be calculated using depth values z of pixels, for example.

In addition to the above, the fog factor value f may, thus, be calculated using Equations 1, 2, and 3 and may be used with the following Equation 4, where a color value to which the fog effect is applied can be obtained by calculating Equation 4.

$$C = f \cdot C_i + (1-f) \cdot C_f \quad \text{Equation 4:}$$

Here, $C_i$ denotes the color value of each vertex, and $C_f$ denotes the color value of the corresponding fog. According to Equation 4, as a fog factor value f of a certain pixel becomes smaller, the original color of the pixel gradually disappears.

Figure 4:
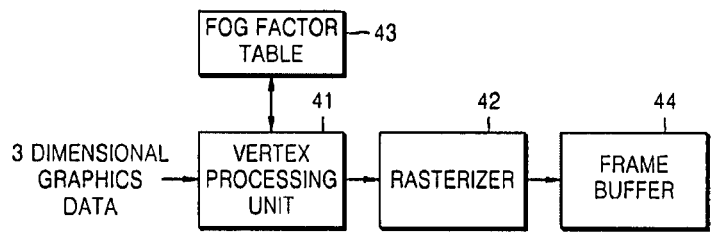
FIG. 4 illustrates a system rendering 3D graphics data using a vertex fog effect, according to an embodiment of the present invention.

FIG. 4 illustrates a system rendering 3D graphics data using a vertex fog effect, according to an embodiment of the present invention.

Referring to FIG. 4, the system may include a vertex processing unit 41, a rasterizer 42, a fog factor table 43, and a frame buffer 44, for example. In particular, the system may render 3D graphics data, in a unit of each vertex of a polygon as a constituent unit of at least one object represented by the 3D graphics data.

Thus, the vertex processing unit 41 may receive 3D graphics data, and perform several processes to obtain the parameter values of vertices of a polygon, e.g., a triangle, as the constituent unit of at least one object represented by the 3D graphics data. Here, the parameter values may be pixel unit information for rendering the at least one object represented by the 3D graphics data. The parameter values may include x and y coordinate values of the corresponding pixels, depth values z of the pixels, color values r, g, b, and a of the pixels, and coordinate values s and t of textures that are to be respectively mapped to the pixels, etc., wherein r represents red, g represents green, b represents blue, and a represents transparency. Here, for example, though RGB data and an x/y coordinate value system has been referred to, alternate embodiments are also available.

As noted above, objects having a variety of shapes can be represented by a group of polygons having the same or similar shapes. In order to reduce the amount of rendering calculations, a triangle, as the simplest polygon shape among a variety of polygon shapes, has generally been used. Hereinafter, when describing embodiments of the present invention, the polygon will be referred to as a triangle. However, embodiments of the present invention should not be limited to the polygons being triangles and embodiments of the present invention can equally be implemented with polygons having different shapes.

Figure 5:
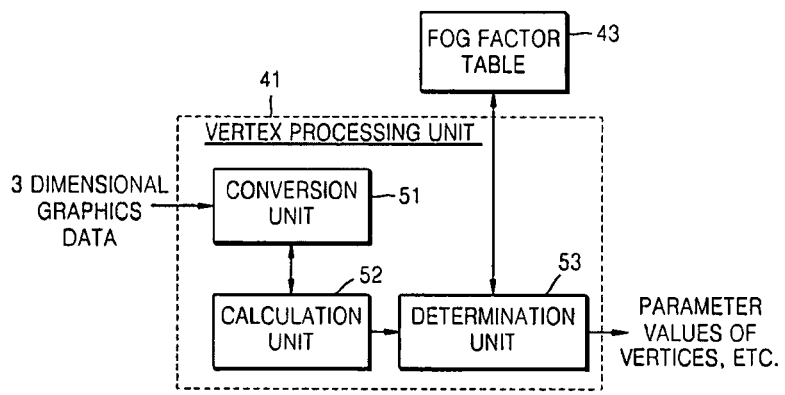
FIG. 5 illustrates a vertex processing unit, such as that illustrated in FIG. 4, according to an embodiment of the present invention.

FIG. 5 illustrates a vertex processing unit, such as the vertex processing unit 41 illustrated in FIG. 4, according to an embodiment of the present invention.

Referring to FIG. 5, the vertex processing unit 41 may include a conversion unit 51, a calculation unit 52, and a determination unit 53, for example.

The conversion unit 51 may receive 3D graphics data, and convert the 3D graphics data into 3D graphics data based on a 2 dimensional plane, using transform matrices including a modelview matrix, a projection matrix, etc., for example.

The example modelview matrix can be used to determine the location and direction of an object on a 2 dimensional plane, and the projection matrix may be used to determine the size and shape of the object on the 2 dimensional plane.

The calculation unit 52 may perform a light calculation on each vertex of a polygon, as a constituent unit of at least one object represented by the converted 3D graphics data, thereby applying a light source effect to the color values r, g, b, and a of each vertex of the polygon, for example. Thus, the calculation unit 52 may calculate a fog factor of each vertex of the polygon. In more detail, the calculation unit 52 may substitute a depth value z of each vertex making up the at least one object represented by the 3D graphics data, for "d" in any one of the above example Equations 1, 2, and 3, and solves the corresponding Equation 1, 2, or 3, thereby obtaining a fog factor f. In an embodiment, a determination of which one of the Equations 1, 2, and 3 is used may be made depending on the performance of the 3D graphics rendering system, a user's desired fog effect strength, etc., for example.

In addition, the calculation unit 52 may apply the fog effect to the respective color values r, g, b, and a of each vertex of the polygon based on the fog factor value f. In more detail, the calculation unit 52 may use the fog factor value f to solve the above example Equation 4, thereby obtaining the color values r, g, b, and a to which the fog effect is applied. In this example case, $C_i$ becomes a color value to which the light source effect is applied. The operation of applying the fog effect can be performed after texture mapping is performed by the rasterizer 42, for example. In this case, $C_i$ becomes a color value to which the light source effect and texture mapping are applied.

The determination unit 53 may extract a threshold value, from among threshold values of fog factors stored in the fog factor table 43, for example, and compare the fog factor value f of each vertex calculated by the calculation unit 52 with the extracted threshold value, and determine whether texture mapping must or is desired to be performed on each vertex, according to the comparison result. That is, if the fog factor value f of the vertex is greater than or meets the threshold value, the determination unit 93 may determine that texture mapping must or is desired to be performed on the vertex. Meanwhile, if the fog factor f of each vertex is equal to or smaller than the threshold value, for example, or fails to meet the threshold value, the determination unit 93 may determine that texture mapping does not need to be performed on the vertex. The case where texture mapping must or is desired to be performed on the vertex corresponds to the case where a texture applied to the vertex can be seen even when the fog effect is applied to the color of the vertex, for example. Meanwhile, the case where texture mapping does not need to be performed on the vertex may correspond to the case where a texture applied to the vertex becomes a fog color when the fog effect is applied to the color of the vertex.

In particular, the determination unit 53 may extract a threshold value, e.g., from among the threshold values stored in the fog factor table 43, based on the type of equation used to calculate the fog factor f, a user's setting, the performance of the 3D graphics rendering system illustrated in FIG. 4, etc., noting that additional and/or alternative determinants may be used. As one example, if the picture quality of 3D graphics is set low by a user, the determination unit 53 may extract the greatest threshold value from among the threshold values stored in the fog factor table 43, according to the user's setting. Similarly, in this example, if the performance of the 3D graphics data rendering system is high, the determination unit 53 may extract the smallest threshold value from among the threshold values stored in the fog factor table 43 so that 3D graphics can be displayed with high picture quality.

The rasterizer 42 may receive the parameter values of the vertices of the triangle, as the constituent unit of the at least one object represented by the 3D graphics data, from the vertex processing unit 41, for example, and calculate final parameter values of pixels of the triangle using the parameter values. In particular, in one embodiment, the rasterizer 42 may receive the determination result on whether texture mapping must or should be performed, from the vertex processing unit 41, and perform texture mapping according to the determination result.

Figure 6:
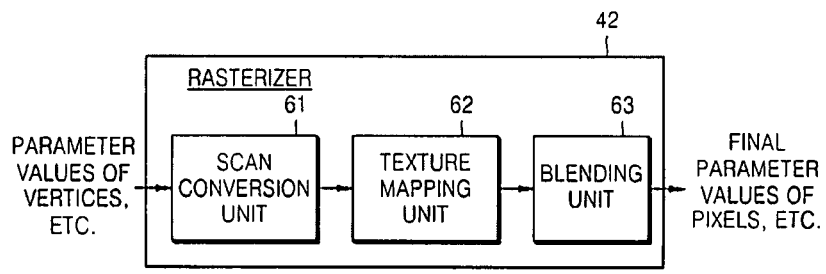
FIG. 6 illustrates a rasterizer, such as that illustrated in FIG. 4, according to an embodiment of the present invention.

FIG. 6 illustrates a rasterizer, such as rasterizer 42 illustrated in FIG. 4, according to an embodiment of the present invention.

Referring to FIG. 6, the rasterizer 42 may include a scan conversion unit 61, a texture mapping unit 62, and a blending unit 63, for example.

The scan conversion unit 61 may determine parameter values of pixels of a triangle, e.g., as the constituent unit of at least one object represented by 3D graphics data processed by the vertex processing unit 41. In more detail, as an example, the scan conversion unit 61 may interpolate respective parameter values of the remaining pixels except for three vertices of each triangle, from the respective parameter values of the three vertices of the triangle, thereby determining final parameter values of all the pixels of the triangle.

The texture mapping unit 62 may perform texture mapping on the 3D graphics data, according to the determination result of the vertex processing unit 41. In particular, in one embodiment, the texture mapping unit 62 may perform texture mapping on the triangle, as the constituent unit of the at least one object represented by the 3D graphics data, according to the determination result of the vertex processing unit 41. In more detail, if the determination unit 53 of the vertex processing unit 41 determines that texture mapping does not need to be performed on all vertices of a certain triangle, the texture mapping unit 62 may not map a texture stored in a memory to each pixel of the triangle. Accordingly, the number of memory access operations can be reduced by the number of omitted texture mapping operations. If the determination unit 53 of the vertex processing unit 41 determines that texture mapping must or is desired to be performed on any one of vertices of a certain triangle, the texture mapping unit 62 may then map a texture stored in the memory (not shown) to each pixel of the triangle.

The blending unit 63 may further blend the color values r, g, and b, for example, of each pixel to which the corresponding texture is mapped by the texture mapping unit 62, with the transparency value a of the pixel. The final parameter values of the pixels output from the blending unit 63 may, thus, be further stored in the frame buffer 44. In particular, the rasterizer 42 illustrated in FIG. 4 can further include different components, such as an alpha text unit and a depth test unit, in addition to and/or other than the above-described components. This can also be applied to the following embodiments.

Figure 7:
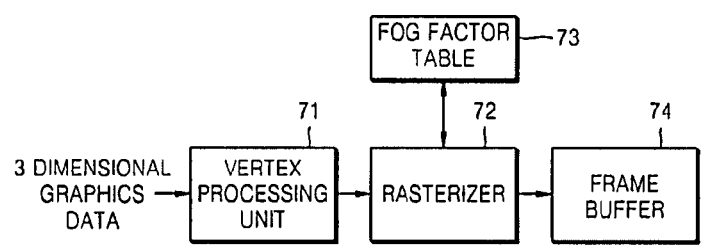
FIG. 7 illustrates a system rendering 3D graphics data considering a pixel fog effect, according to an embodiment of the present invention.

FIG. 7 illustrates a system rendering 3D graphics data using a pixel fog effect, according to an embodiment of the present invention.

Referring to FIG. 7, the 3D graphics data rendering system may include a vertex processing unit 71, a rasterizer 72, a fog factor table 73, and a frame buffer 74, for example. Particularly, the 3D graphics rendering system illustrated in FIG. 7 may render 3D graphics data, in a unit of each pixel of a polygon as the constituent unit of at least one object represented by 3D graphics data.

Here, the vertex processing unit 71 may receive 3D graphics data, and perform several processes to obtain respective parameter values of vertices of a triangle as a constituent unit of at least one object represented by the 3D graphics data.

Figure 8:
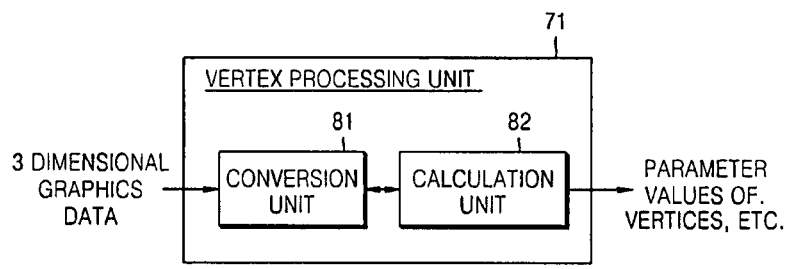
FIG. 8 illustrates a vertex processing unit, such as that illustrated in FIG. 7, according to an embodiment of the present invention.

FIG. 8 illustrates a vertex processing unit, such as the vertex processing unit 71 illustrated in FIG. 7, according to an embodiment of the present invention.

The vertex processing unit 71 may include a conversion unit 81 and a calculation unit 82, for example.

The conversion unit 81 may receive 3D graphics data and convert the 3D graphics data into 3D graphics data based on a 2 dimensional plane, e.g., using the aforementioned transform matrices including the modelview matrix, the projection matrix, etc.

The calculation unit 82 may perform a light calculation on each vertex of a polygon, as a constituent unit of at least one object represented by the 3D graphics data, thereby applying a light source effect to the respective color values r, g, b, and a of the each vertex, for example.

Referring to FIG. 7, the rasterizer 72 may receive the respective parameter values of vertices of the triangle, as the constituent unit of the at least one object represented by the 3D graphics data, from the vertex processing unit 71, and calculate final parameter values of the pixels of the triangle using the parameter values.

Figure 9:
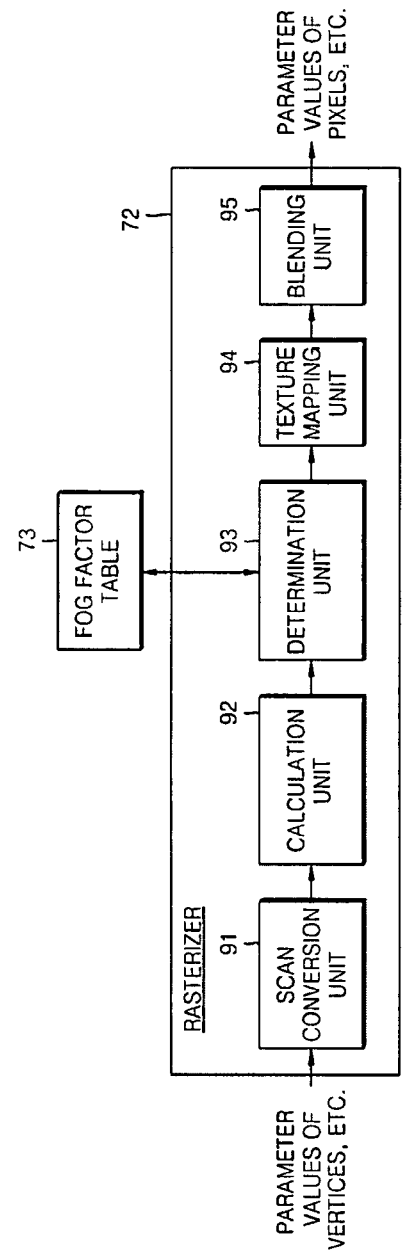
FIG. 9 illustrates a rasterizer, such as that illustrated in FIG. 7, according to an embodiment of the present invention.

FIG. 9 illustrates a rasterizer, such as the rasterizer 72 illustrated in FIG. 7, according to an embodiment of the present invention;

Referring to FIG. 9, the rasterizer 72 may include a scan conversion unit 91, a calculation unit 92, a determination unit 93, a texture mapping unit 94, and a blending unit 95, for example.

The scan conversion unit 81 may determine parameter values of pixels of a triangle, e.g., as a constituent unit of at least one object represented by 3D graphics data processed by the vertex processing unit 71. In more detail, the scan conversion unit 81 may interpolate parameter values of the remaining pixels except for three vertices of the triangle, from the parameter values of the three vertices of the triangle, thereby determining parameter values of the pixels of the triangle.

The calculation unit 92 may further calculate a fog factor f of each pixel of the triangle. In more detail, the calculation unit 92 may substitute a depth value z of each of the pixels that construct at least one object represented by the 3D graphics data, for "d" in the above example Equation 1, 2, or 3, and solve the corresponding Equation 1, 2, or 3, thereby obtaining a fog factor value f.

In addition, the calculation unit 92 may apply the fog effect to the color value of each pixel of the polygon, as the constituent unit of the at least one object represented by the 3D graphics data, based on the fog factor value f. In more detail, the calculation unit 92 may substitute the fog factor value f into the above Equation 4, for example, and solve Equation 4, thereby obtaining color values r, g, b, and a to which the fog effect is applied. In this case, $C_i$ becomes a color value to which a light source effect is applied. The operation of applying the fog effect can be performed after texture mapping is performed by the texture mapping unit 94, for example, and in which case, $C_i$ becomes a color value to which a light source effect and texture mapping are applied.

The determination unit 93 may extract a threshold value from among fog factor threshold values stored in the fog factor table 73, compare the fog factor f of each pixel calculated by the calculation unit 92 with the threshold value, and determine whether texture mapping must or is desired to be performed on the pixel according to the comparison result. In more detail, and as an example, the determination unit 93 may compare a fog factor f of a vertex whose depth value z is a minimum, from among three vertices of a certain triangle, with the extracted threshold value, and determine whether texture mapping must or is desired to be performed on the triangle according to the comparison result. If a fog factor value f of a vertex whose depth value z is a minimum, among three vertices of a certain triangle, is greater than or meets a threshold value, the determination unit 93 may determine that texture mapping must or is desired to be performed on the triangle. This case corresponds to the case where the fog factors f of all the pixels of the triangle are greater than or meet the threshold value, for example.

In addition, If a fog factor value f of a vertex whose depth value z is a minimum, from among three vertices of a certain triangle, is equal to or smaller than the extracted threshold value, or fails to meet the threshold value, the determination unit 93 may compare a fog factor value f of a vertex whose depth value z is a maximum, from among the three vertices of the triangle, with the extracted threshold value, and determine whether texture mapping must or is desired to be performed on the triangle according to the comparison result. That is, if a fog factor f of a vertex whose depth value z is a minimum, from among three vertices of a certain triangle, is equal to or smaller than the extracted threshold value, or fails to meet the threshold value, the determination unit 93 may determine that texture mapping does not need to be performed on the triangle. This case corresponds to the case where the fog factors f of all the pixels of the triangle are equal to or smaller than (or fail to meet) the threshold value.

Further, if the fog factor f of the vertex whose depth value z is a minimum, from among the three vertices of the triangle, is greater than or meets the extracted threshold value and the fog factor f of the vertex whose depth value is a maximum, from among the three vertices of the triangle, is greater than or meets the extracted threshold value, the determination unit 93 may compare the fog factors f of the respective pixels of the triangle with the extracted threshold value, and determine whether texture mapping must or is desired to be performed on the respective pixels according to the comparison result. That is, if a fog factor f of a certain pixel is greater than or meets the extracted threshold value, the determination unit 93 may determine that texture mapping must or is desired to be performed on the pixel, and if the fog factor f of the certain pixel is equal to or smaller than the extracted threshold value, or fails to meet the extracted threshold value, the determination unit 93 may determine that texture mapping does not need to be performed on the pixel.

In particular, in this embodiment, the determination unit 93 may extract a threshold value from among threshold values stored in the fog factor table 73, for example, based on the type of equation used to calculate the fog factor f, a user's setting, the performance of the 3D graphics data rendering system illustrated in FIG. 4, etc., again noting that additional determinants may be available. As an example, if the picture quality of 3D graphics is set low by a user, the determination unit 93 may extract the greatest threshold value from among the threshold values stored in the fog factor table 73, according to the user's setting. Similarly, if the performance of the 3D graphics data rendering apparatus illustrated in FIG. 4 is high, the determination unit 93 may extract the smallest threshold value from among the threshold values stored in the fog factor table so that 3D graphics can be displayed with high picture quality.

The texture mapping unit 94 may perform texture mapping on the 3D graphics data according to the determination result. In particular, in this embodiment, the texture mapping unit 94 may perform texture mapping on a triangle, as a constituent unit of at least one object represented by the 3D graphics data, according to the determination result of the determination unit 93. In more detail, if the determination unit 93 determines that texture mapping does not need to be performed on a certain triangle, the texture mapping unit 94 does not map a texture stored in a memory to each pixel of the triangle. If the determination unit 93 determines that texture mapping must or is desired to be performed on the triangle, the texture mapping unit 94 maps a texture stored in the memory to each pixel of the triangle.

Further, if the determination unit 93 determines that texture mapping does not need to be performed on a pixel, the texture mapping unit 94 may not map a texture stored in the memory to the pixel. Likewise, if the determination unit 93 determines that texture mapping must or is desired to be performed on the pixel, the texture mapping unit 94 may map a texture stored in the memory to the pixel.

The blending unit 95 may blend color values r, g, and b, for example, of each pixel to which a texture is mapped by the texture mapping unit 94, with the transparency value a of the pixel. In particular, the example rasterizer 72, as illustrated in FIG. 7, may further include different components, such as an alpha text unit and a depth test unit, other than the above-described components, and is equally available to other embodiments of the present invention.

FIG. 10 illustrates a method rendering 3D graphics data using a vertex fog effect, according to an embodiment of the present invention.

Referring to FIG. 10, the 3D graphics data rendering method using the vertex fog effect includes operations in which the 3D graphics data may be sequentially processed by, e.g., by the 3D graphics data rendering system illustrated in FIG. 4, noting that alternative embodiments are equally available.

In operation 101, 3D graphics data may be received and converted into 3D graphics data based on a 2 dimensional plane, e.g., using transform matrices including the model-view matrix, the projection matrix, etc., again noting that alternatives are also available.

In operation 102, a light calculation may be performed on each vertex of a triangle, for example, as a constituent unit of at least one object represented by the 3D graphics data, thereby applying a light source effect to the color values r, g, b, and a of the vertex.

In operation 103, a fog factor value f of each vertex of the triangle, for example, as the constituent unit of the at least one object represented by the 3D graphics data, may be calculated, and a fog effect applied to the color values r, g, b, and a of the each vertex of the triangle, e.g., as the constituent unit of the at least one object represented by the 3D graphics data, on the basis of the fog factor value f.

In operation 104, a threshold value may be extracted from among fog factor threshold values stored in the fog factor table 43, for example, the fog factor value f of each vertex calculated in operation 103 may further be compared with the extracted threshold value, and it may be determined whether texture mapping must or would be desired to be performed on the vertex, according to the comparison result.

In operation 105, parameter values of the remaining pixels except for three vertices of the example triangle, as the constituent unit of the at least one object represented by the 3D graphics data processed in operations 101, 102, and 103, may be interpolated from the parameter values of the three vertices of the triangle, so that the parameter values of all the pixels of the triangle are determined.

In operation 106, if it is determined in operation 104 that texture mapping does not need to be performed, e.g., on the three vertices of the triangle, the process may proceed to operation 108, while if it is determined that texture mapping must or would be desired to be performed on any one of the three vertices of the triangle, the process may proceed to operation 107.

In operation 107, a texture stored in the memory, for example, may be mapped to each pixel of the triangle.

In operation 108, the color values r, g, and b of each pixel, to which a texture is mapped in operation 107, are blended with the transparency value a of the pixel.

In operation 109, if operations 102 through 108 are completed on all triangles, for example, the process may be terminated. If operations 102 through 108 have not been performed on all triangles, the process may return to operation 101 in order to perform operations 102 through 108 on the remaining triangles.

Figure 11A:
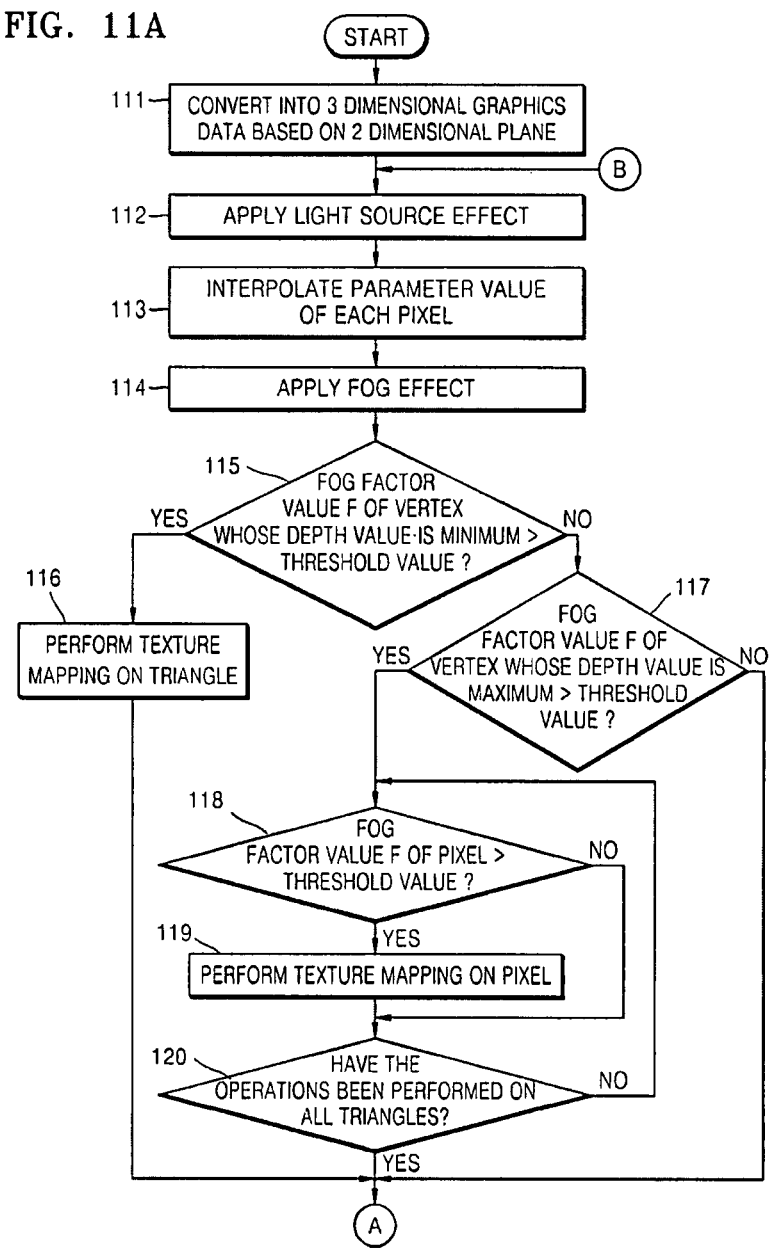
FIGS. 11A and 11B illustrate a method for rendering 3D graphics data using a pixel fog effect, according to an embodiment of the present invention.
Figure 11B:
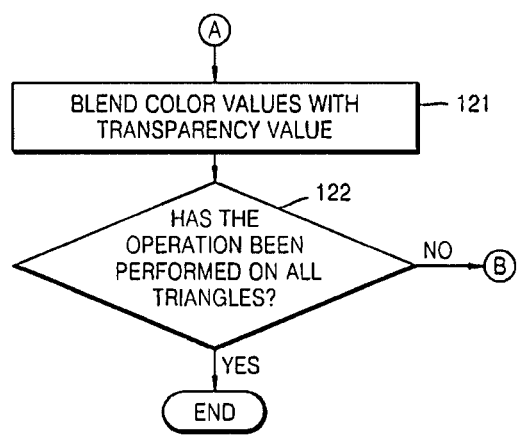

FIGS. 11A and 11B illustrate a method rendering 3D graphics data using a pixel fog effect, according to an embodiment of the present invention.

Referring to FIGS. 11A and 11B, the 3D graphics data rendering method may include operations that may be sequentially processed by the 3D graphics data rendering system illustrated in FIG. 7, for example, noting that alternative embodiments are equally available.

In operation 111, 3D graphics data may be received and converted into 3D graphics data based on a 2 dimensional plane, e.g., using transform matrices including the model-view matrix, the projection matrix, etc.

In operation 112, a light calculation may be performed on each vertex of a triangle, for example, as a constituent unit of at least one object represented by the 3D graphics data, thereby applying a light source effect to the color values r, g, b, and a of each vertex.

In operation 113, parameter values of the remaining pixels, except for three vertices of the triangle, for example, as the constituent unit of the at least one object represented by the 3D graphics data processed in operations 111 and 112, are interpolated from the parameter values of the three vertices of the triangle, so that the parameter values of all the pixels of the triangle are obtained.

In operation 114, a fog factor value f of each pixel of the triangle, as the constituent unit of the at least one object represented by the 3D graphics data, is calculated, and a fog effect is applied to each pixel of the triangle, as the constituent unit of the at least one object represented by the 3D graphics data, based on the fog factor value f.

In operation 115, a threshold value may be extracted from among fog factor threshold values stored in the fog factor table 73, for example, and a fog factor value f of a vertex whose depth value z is a minimum, from among the three vertices of the triangle, may be compared with the extracted threshold value. Here, in operation 115, if the fog factor value f of the vertex whose depth value z is the minimum is greater than or meets the extracted threshold value, it may be determined that texture mapping must or would be desired to be performed on the triangle, and the process proceeds to operation 116. Similarly, if the fog factor f of a vertex whose depth value z is the minimum is equal to or smaller than, or fails to meet, the extracted threshold value, the process proceeds to operation 117.

In operation 116, a texture stored in a memory, for example, may be mapped to each pixel of the triangle.

In operation 117, a fog factor f of a vertex whose depth value z is a maximum, among the three vertices of the triangle, may be compared with the extracted threshold value. If the fog factor f of the vertex whose depth value z is the maximum is equal to or smaller than, or fails to meet, the extracted threshold value, it may be determined that texture mapping does not need to be performed on the triangle, and the process proceeds to operation 121. If the fog factor f of the vertex whose depth value z is the maximum is greater than or meets the extracted threshold value, the process may proceed to operation 118.

In operation 118, a fog factor value f of each pixel of the triangle may be compared with the extracted threshold value, and it may be determined whether the fog factor f of the pixel is greater than or meets the extracted threshold value according to the comparison result. If the fog factor value f of the pixel is greater than or meets the extracted threshold value, it may be determined that texture mapping must or would be desired to be performed on the pixel, and the process proceeds to operation 119. If the fog factor value f of the pixel is equal to or smaller than, or fails to meet, the extracted threshold value, it may be determined that texture mapping does not need to be performed on the pixel, and the process proceeds to operation 120.

In operation 119, a texture stored in a memory, for example, may be mapped to the pixel.

In operation 120, if operations 118 and 119 are completed on all the pixels of the triangle, the process may proceed to operation 121, and if operations 118 and 119 have not been performed on all pixels of the triangle, the process may return to operation 118 in order to perform operations 118 and 119 on the remaining pixels.

In operation 121, the color values r, g, and b, for example, of each pixel to which the corresponding texture is mapped in operations 116 and 119, may be blended with the transparency value a of the pixel.

In operation 122, the process may, thus, be terminated if operations 112 through 121 have been completed on all triangles represented by the 3D graphics data. If operations 112 through 121 have not been performed on all triangles, the process may return to operation 112 in order to perform operations 112 through 121 on the remaining triangles.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, by performing texture mapping according to the strength of a fog effect that will be applied to 3D graphics data, it is possible to reduce the number of memory access operations for reading textures. As such, since the number of memory access operations for reading textures is reduced, it is possible to minimize the number of calculations used to access memory and rendering consumption power, as well as reduce the time required to access memory. As a result, according to one or more embodiments of the present invention, since the power and time consumed to render 3D graphics data can be minimized, it is possible to render 3D graphics data in real time in mobile terminals, low end desktop PCs, etc., including devices having low hardware performance, for example.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A rendering method, comprising:
   selectively using at least one processor in an electronic device, implementing one of performing and not performing texture mapping of a respective texture on respective 3D graphics data based on a first value representing a respective fog density and a second value representing object distance effect applied to the respective graphics data,
   wherein the respective fog effect is different from the respective texture,
   wherein the selective implementing of the texture mapping is based on a comparison of a strength of the respective fog effect which is calculated from the first value representing the respective fog density and the second value representing the object distance effect, and a predetermined extracted threshold value which is located between maximum value and minimum value on one graph representing a change of the strength of the respective fog effect,
   said extracted threshold value is extracted from among a plurality of fog factor threshold values stored in a fog factor table, wherein the extracting is based upon at least all of the following:
   (a) extracting the greatest threshold value from among the threshold values stored in the fog factor table if the picture quality of 3D graphics is set low by a user
   (b) extracting the smallest threshold value from among the threshold values stored in the fog factor table if the rendering performance of said electronic device is high
   wherein the extracted threshold value is not equal to the maximum value or the minimum value,
   reducing the power consumption of said electronic device by not retrieving a texture from a texture memory when the comparison of the strength and the threshold indicate the strength is below the extracted threshold.

2. The rendering method of claim 1, further comprising calculating a strength of the respective fog effect that is to be applied to the respective graphics data, such that the selective implementing of the texture mapping on the respective graphics data is based upon the calculated strength of the respective fog effect.

3. The rendering method of claim 1, further comprising performing a determining operation to determine whether to perform the texture mapping on the respective graphics data such that the selective implementing of the texture mapping is based upon a result of the determining operation.

4. The rendering method of claim 1, wherein a performance level of rendering of the graphics data is controlled based the extracted threshold value being selected from the fog factor table comprising the plurality of fog factor threshold values.

5. The rendering method of claim 1, further comprising:
   calculating a strength of the respective fog effect that is to be applied to the respective graphics data, such that the selective implementing of the texture mapping on the respective graphics data is based upon the calculated strength of the respective fog effect; and
   a determining operation to determine whether to perform the texture mapping on the respective graphics data such that the selective implementing of the texture mapping is based upon a result of the determining operation,
   wherein the calculating of the strength of the respective fog effect further comprises calculating strengths of respective fog effects that are to be applied to each vertex of a polygon as a constituent unit of at least one object represented by the graphics data, and
   the determining of whether to perform the texture mapping comprises determining whether texture mapping is performed on all vertices of the polygon.

6. The rendering method of claim 5, wherein, in the selective implementing of the texture mapping, if it is determined in the determination operation that the texture mapping is not performed on all vertices of the polygon, no texture is mapped to each pixel of the polygon.

7. The rendering method of claim 1, further comprising:
calculating a strength of the respective fog effect that is to be applied to the respective graphics data, such that the selective implementing of the texture mapping on the respective graphics data is based upon the calculated strength of the respective fog effect; and
a determining operation to determine whether to perform the texture mapping on the respective graphics data such that the selective implementing of the texture mapping is based upon a result of the determining operation,
wherein the calculating of the strength of the respective fog effect comprises calculating the strength of the respective fog effect that is to be applied to each respective pixel of a polygon as a constituent unit of at least one object represented by the graphics data, and
the determining of whether to perform the texture mapping on the respective graphics data determines whether texture mapping is performed on each pixel of the polygon.

8. The rendering method of claim 7, wherein, in the determining of whether to perform the texture mapping, if a fog factor of a vertex, whose depth value is a maximum of depth values of vertices of the polygon, fails to meet the extracted threshold value, the texture mapping is not performed on the polygon.

9. The rendering method of claim 7, wherein, in the determining of whether to perform the texture mapping, texture mapping is performed on each pixel of the polygon based on respective fog factors of each pixel of the polygon compared with the extracted threshold value, if a fog factor of a vertex whose depth value is a minimum of depth values of vertices of the polygon meets the extracted threshold value and a fog factor of a vertex whose depth value is a maximum of the depth values of the vertices of the polygon fails to meet the extracted threshold value.

10. A rendering method, comprising:
selectively using at least one processor in an electronic device, implementing one of performing and not performing texture mapping of a respective texture on respective 3D graphics data based on a first value representing a respective fog density and a second value representing object distance effect applied to the respective graphics data,
wherein the respective fog effect is different from the respective texture,
calculating a strength of the respective fog effect that is to be applied to the respective graphics data, such that the selective implementing of the texture mapping on the respective graphics data is based upon the calculated strength of the respective fog effect; and
a determining operation to determine whether to perform the texture mapping on the respective graphics data such that the selective implementing of the texture mapping is based upon a result of the determining operation,
wherein the calculating of the strength of the respective fog effect comprises calculating the strength of the respective fog effect that is to be applied to each respective pixel of a polygon as a constituent unit of at least one object represented by the graphics data, and
the determining of whether to perform the texture mapping on the respective graphics data determines whether texture mapping is performed on each pixel of the polygon,
wherein, in the determining of whether to perform the texture mapping, if a fog factor of a vertex, whose depth value is minimum of depth values of vertices of the polygon, meets a predetermined extracted threshold value, the texture mapping is performed on the polygon where the fog factor (f) of the vertex is calculated as follows:

$$f = 1/e^{(d \times density)^2},$$

wherein density is said fog density where d denotes the distance between a viewpoint of a 3D image represented by a plurality of 3D graphics data and a location of said vertex at which said fog effect is to be displayed,
said extracted threshold value is extracted from among a plurality of fog factor threshold values stored in a fog factor table, wherein the extracting is based upon at least all of the following:
(a) extracting the greatest threshold value from among the threshold values stored in the fog factor table if the picture quality of 3D graphics is set low by a user
(b) extracting the smallest threshold value from among the threshold values stored in the fog factor table if the rendering performance of said electronic device is high
reducing the power consumption of said electronic device by not retrieving a texture from a texture memory when the comparison of the strength and the threshold indicate the strength is below the extracted threshold.

11. A non-transitory computer readable medium comprising computer readable code to control at least one processing element to implement a rendering method, the rendering method comprising:
selectively using at least one processor in an electronic device, implementing one of performing and not performing texture mapping of a respective texture on respective 3D graphics data based on a first value representing a respective fog density and a second value representing object distance effect applied to the respective graphics data,
wherein the respective fog effect is different from the respective texture,
wherein the selective implementing of the texture mapping is based on a comparison of a strength of the respective fog effect which is calculated from the first value representing the respective fog density and the second value representing the object distance effect, and a predetermined extracted threshold value which is located between maximum value and minimum value on one graph representing a change of the strength of the respective fog effect,
said extracted threshold value is extracted from among a plurality of fog factor threshold values stored in a fog factor table, wherein the extracting is based upon at least all of the following:
(a) extracting the greatest threshold value from among the threshold values stored in the fog factor table if the picture quality of 3D graphics is set low by a user
(b) extracting the smallest threshold value from among the threshold values stored in the fog factor table if the rendering performance of said electronic device is high
wherein the extracted threshold value is not equal to the maximum value or the minimum value,
reducing the power consumption of said electronic device by not retrieving a texture from a texture memory when the comparison of the strength and the threshold indicate the strength is below the extracted threshold.

12. The medium of claim 11, wherein the method further comprises performing a determining operation to determine whether to perform the texture mapping on the respective graphics data such that the selective implementing of the texture mapping is based upon a result of the determining operation.

13. A system, including at least one processing device, with rendering, comprising:
a texture mapping unit, using the at least one processor in an electronic device, to selectively implement one of performing and not performing texture mapping of a respective texture on respective 3D graphics data based on a first value representing a respective fog density and a second value representing object distance effect applied to the respective graphics data,
wherein the respective fog effect is different from the respective texture,
wherein the selective implementing of the texture mapping is based on a comparison of a strength of the respective fog effect which is calculated from the first value representing the respective fog density and the second value representing the object distance effect, and a predetermined extracted threshold value which is located between maximum value and minimum value on one graph representing a change of the strength of the respective fog effect,
said extracted threshold value is extracted from among a plurality of fog factor threshold values stored in a fog factor table, wherein the extracting is based upon at least all of the following:
(a) extracting the greatest threshold value from among the threshold values stored in the fog factor table if the picture quality of 3D graphics is set low by a user (b) extracting the smallest threshold value from among the threshold values stored in the fog factor table if the rendering performance of said electronic device is high
wherein the extracted threshold value is not equal to the maximum value or the minimum value,
reducing the power consumption of said electronic device by not retrieving a texture from a texture memory when the comparison of the strength and the threshold indicate the strength is below the extracted threshold.

14. The system of claim 13, further comprising a calculation unit to calculate a strength of the respective fog effect that is to be applied to the respective graphics data, such that the selective implementing of the texture mapping on the respective graphics data, by the texture mapping unit, is based upon the calculated strength of the respective fog effect.

15. The system of claim 13,
wherein the determination unit performs a determining operation to determine whether to perform the texture mapping on the respective graphics data such that the selective implementing of the texture mapping, by the texture mapping unit, is based upon a result of the determining operation.

16. The system of claim 13,
wherein the extracted threshold value is selected from the memory by the user the selective implementing of the texture mapping corresponds to a performance level of rendering of the graphics data.

17. The system of claim 13, further comprising:
a calculation unit to calculate a strength of the respective fog effect that is to be applied to the respective graphics data, such that the selective implementing of the texture mapping on the respective graphics data, by the texture mapping unit, is based upon the calculated strength of the respective fog effect,
wherein the determination unit performs a determining operation to determine whether to perform the texture mapping on the respective graphics data such that the selective implementing of the texture mapping, by the texture mapping unit, is based upon a result of the determining operation,
wherein the calculation unit calculates strengths of respective fog effects that are to be applied to each vertex of a polygon as a constituent unit of at least one object represented by the graphics data, and
the determination unit determines whether texture mapping is performed on all vertices of the polygon.

18. The system of claim 17, wherein, in the selective implementing of the texture mapping by the texture mapping unit, if it is determined in the determination operation by the determination unit that the texture mapping is not performed on all vertices of the polygon, no texture is mapped to each pixel of the polygon.

19. The system of claim 13, further comprising:
a calculation unit to calculate a strength of the respective fog effect that is to be applied to the respective graphics data, such that the selective implementing of the texture mapping on the respective graphics data, by the texture mapping unit, is based upon the calculated strength of the respective fog effect,
wherein the determination unit performs a determining operation to determine whether to perform the texture mapping on the respective graphics data such that the selective implementing of the texture mapping, by the texture mapping unit, is based upon a result of the determining operation,
wherein the calculation unit calculates the strength of the respective fog effect that is to be applied to each respective pixel of a polygon as a constituent unit of at least one object represented by the graphics data, and
the determination unit determines whether texture mapping is performed on each pixel of the polygon.

20. The system of claim 19, wherein, in the determining of whether to perform the texture mapping by the determination unit, if a fog factor of a vertex, whose depth value is minimum of depth values of vertices of the polygon, meets the extracted threshold value, the texture mapping is determined to not be performed on the polygon.

21. The system of claim 19, wherein, in the determining of whether to perform the texture mapping by the determination unit, if a fog factor of a vertex, whose depth value is a maximum of depth values of vertices of the polygon, fails to meet the extracted threshold value, the texture mapping is determined to not be performed on the polygon.

22. The system of claim 19, wherein, in the determining of whether to perform the texture mapping by the determination unit, texture mapping is determined to be performed on each pixel of the polygon based on respective fog factors of each pixel of the polygon compared with the extracted threshold value, if a fog factor of a vertex whose depth value is a minimum of depth values of vertices of the polygon meets the extracted threshold value and a fog factor of a vertex whose depth value is a maximum of the depth values of the vertices of the polygon fails to meet the extracted threshold value.

23. A rendering method, comprising:
performing, using at least one processor in an electronic device, texture mapping of an object texture to a polygon when a combined fog density and object distance value is above a fog density and object distance threshold; and
not performing the texture mapping when the combined fog density and object distance value is less than or equal to the fog density and object distance threshold;
wherein the performing of the texture mapping is based on a comparison of a strength of the respective fog effect which is calculated from a first value representing the respective fog density and a second value representing the object distance effect, and a predetermined extracted threshold value which is located between maximum value and minimum value on one graph representing a change of the strength of the respective fog effect, said extracted threshold value is extracted from among a plurality of fog factor threshold values stored in a fog factor table, wherein the extracting is based upon at least all of the following:

(a) extracting the greatest threshold value from among the threshold values stored in the fog factor table if the picture quality of 3D graphics is set low by a user (b) extracting the smallest threshold value from among the threshold values stored in the fog factor table if the rendering performance of said electronic device is high wherein the extracted threshold value is not equal to the maximum value or the minimum value, reducing the power consumption of said electronic device by not retrieving a texture from a texture memory when the comparison of the strength and the threshold indicate the strength is below the extracted threshold.

\* \* \* \* \*